April 12, 1966 L. W. CLAYTON 3,246,260

PHASE PULSE MODULATOR

Filed Nov. 8, 1963

INVENTOR:
LLOYD W. CLAYTON
BY
Harrington A. Lackey
ATTORNEY 3,246,260
Patented Apr. 12, 1966

3,246,260
PHASE PULSE MODULATOR

Lloyd W. Clayton, 623 W. Iris Drive, Nashville, Tenn.

Filed Nov. 8, 1963, Ser. No. 322,449
3 Claims. (Cl. 332—9)

This invention relates to a phase modulator, and more particularly to a phase modulator in which the modulating index approaches 2.

Heretofore, conventional electronic phase modulating circuits have been able to attain a modulation index in the order of 0.2. Moreover, such circuits require a large amount of electronic equipment in order to obtain such a limited degree of phase modulation.

It is therefore an object of this invention to provide a simplified and more economical electronic phase modulating circuit which will produce a modulation index of about 2, or about ten times the phase modulation heretofore obtained.

One object of this invention is to generate a saw-tooth waveform voltage, apply the saw-tooth voltage to a trigger circuit for producing sharp spikes or pulses, and to vary the phase of the spikes with a modulating voltage.

Another object of this invention is to provide a phase modulating circuit including a Schmitt trigger coupled to a saw-tooth waveform voltage generator for producing a train of sharp positive spikes and applying a modulating voltage to vary the phase of the spikes.

Another object of this invention is to provide a phase modulating circuit including a crystal oscillator, a Miller integrator and a Schmitt trigger coupled together to produce a train of sharp positive pulses or spikes, and to vary the phase of these spikes through a wide angle by means of a modulating audio frequency voltage.

Further objects and advantages of the invention will be apparent from the following description taken in conjunction with the drawing, wherein.

Figures 1, 2:
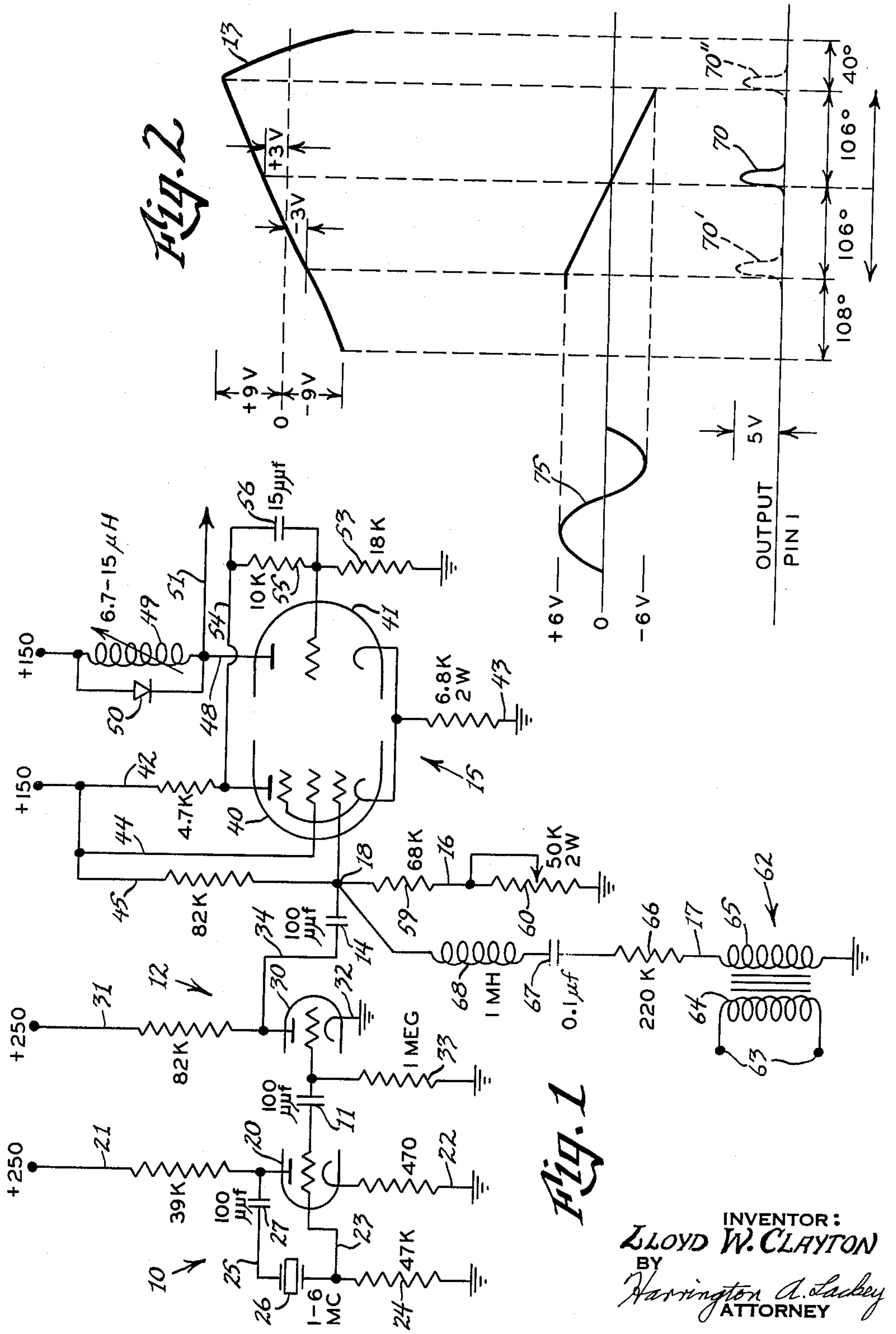
FIG. 1 is an electronic circuit diagram of the preferred form of the device.
FIG. 2 is a "synchrogram" or a composite time-voltage graph, showing the limits of operation of the device disclosed in FIG. 1.

Referring now more particularly to the drawing, FIG. 1 discloses a crystal oscillator circuit 10 coupled through the capacitor 11 to an integrator circuit 12, preferably a Miller integrator, for producing a saw-tooth waveform voltage 13 (FIG. 2). The output of the integrator circuit 12 is coupled through the capacitor 14 to the input of the trigger circuit 15. The grid control circuit 16 and the modulating circuit 17 are also connected to the input of the trigger circuit 15 at junction 18.

The crystal oscillator circuit 10 includes a tube element, such as the triode 20 having an anode plate, cathode and control grid, a resistive plate circuit 21 and a grounded resistive cathode circuit 22. The control grid circuit 23 is grounded through the resistor 24 and connected with the plate circuit 21 through circuit 25 including the crystal 26 and the capacitor 27.

The integrator circuit 12 includes a tube element, such as the triode 30 having a plate, cathode and grid, a resistive plate circuit 31 and a grounded cathode circuit 32. The grid of the tube element 30 is grounded through the resistor 33 and coupled to the grid of the oscillator circuit 10 through the capacitor 11. The output of the plate circuit 31 is connected through the lead 34 to the capacitor 14.

If desired, the triodes 20 and 30 may be incorporated in a single tube, such as the 6SN7. The oscillator circuit 10 and the integrator circuit 12 are designed to operate at radio frequencies up to 6 megacycles, and will produce a saw-tooth waveform voltage at the frequency of the crystal 26. With the values of the electrical components disclosed in FIG. 1, the circuits 10 and 12 will operate at a frequency of about three megacycles.

The trigger circuit 15, preferably a Schmitt trigger, includes a pair of tube elements 40 and 41, each having an anode plate, cathode and control grid. As disclosed in FIG. 1, the tube element 40 is a pentode including the additional suppressor grid and screen grid, while the tube element 41 is a triode. The pentode 40 includes a resistive plate circuit 42, a grounded resistive cathode circuit 43, to which the cathode of tube 41 is also connected in parallel, a screen grid circuit 44 and a resistive circuit 45 connecting the control grid to the plate circuit 42. The triode 41 has a plate circuit 48, including in parallel a variable inductance 49 and a rectifier, such as the 1N618 diode 50. The output lead 51 is connected to the plate circuit 48 between the inductor 49 and the plate of the tube 41. The grid of the tube 41 is grounded through the resistor 53, and is also connected to the plate circuit 42 through the circuit 54, which includes in parallel a resistor 55 and capacitor 56.

Although the tube elements 40 and 41 have been described separately, they may be combined in a single vacuum tube, such as the 6U8.

The grid control circuit 16 includes in series a resistor 59 and a grounded potentiometer 60.

The modulating circuit 17 includes a transformer 62 having audio input terminals 63 at each end of the primary coil 64. The grounded secondary coil 65 is connected in series with a resistor 66, a capacitor 67, an inductor 68 and the junction 18.

All the plate circuits 21, 31, 42 and 48 are adapted to be energized by appropriate direct current voltages, such as indicated in FIG. 1.

Initially assuming that no modulating voltage is being applied through the circuit 17 to the grid of tube element 40, the plate circuits 21 and 31 are impressed with an E.M.F. of about 250 volts and the plate circuits 42 and 48 are impressed with about 150 volts each. For a plate voltage of 150 volts, the upper limit of the hysteresis range of the Schmitt trigger is +78 volts while the lower limit is about +72 volts. Therefore, the potentiometer 60 is set in the center of this range about +75 volts for the D.C. grid bias. The crystal oscillator circuit 10 produces a pure sinusoidal RF voltage which is converted by the integrator circuit 12 into the saw-tooth waveform voltage 13, shown in FIG. 2. It will be noted that, with the values assumed, the saw-tooth voltage is about 18 volts peak-to-peak, and the rising positive-directed portion of the waveform covers about 320° of the cycle, while the negative sloping portion of the waveform 13 covers only about 40° of the cycle. This train of saw-tooth waveforms is impressed upon the grid of the pentode 40 along with the D.C. bias.

Under normal operating conditions, the tube element 40 is cut off while the tube element 41 conducts heavily. However, as soon as the instantaneous value of the grid bias rises to the upper limit of the hysteresis range, +78 volts, or when the waveform 13 has risen to a value of +3 volts on the scale as shown in FIG. 2, the tube element 40 breaks down and is immediately driven into conduction causing a rapid voltage drop at its plate and a sharp rise in its cathode voltage. This rapid change of voltages in tube element 40 immediately reduces the cathode voltage and the grid voltage of tube element 41 to cut off the tube element 41 and produce a sharp positive rise in voltage across the inductor 49 in the plate circuit 48. Thus, the alternate non-conducting and conducting conditions of the tube elements 40 and 41 are reversed.

The rectifier or diode 50 connected across the inductor 49 prevents ringing in the plate circuit 48, and a sharp positive spike or pulse 70, as graphically illustrated in solid lines in FIG. 2, is produced in the output circuit 51. Although the period of the pulse 70 is short, the trigger circuit 15 will remain in the reversed state which produced the pulse, until the negative-directed portion of the saw-tooth wave 13 drops to the lower limit of the hysteresis range, which is −3 volts on the graph of FIG. 2, or a grid bias of +72 volts in tube element 40. At this value, the tube element 40 is again cut off and the tube 41 is simultaneously driven into conduction, and the operation of the trigger circuit 15 is returned to normal. As the tube element 41 goes into conduction, the negative-going transient across the inductor 49 is short-circuited through the diode 50.

Each cycle of the saw-tooth waveform 13 repeats the alternating conduction in the trigger circuit 15, so that a continuous train of sharp positive spikes or pulses 70 are produced in the output circuit 51 in synchronism with the crystal oscillator circuit 10. It will be observed in the "synchrogram" of FIG. 2, that each output pulse 70 has a value of approximately +5 volts for the values of the electrical elements shown in the drawing.

In order to vary the phase of the output pulses 70, a modulating voltage 75 of audio frequency, shown in FIG. 2 as having a peak-to-peak value of 12 volts, is impressed upon the audio input terminals 63. The audio signal is then transmitted through the modulating circuit 17 to be added to the saw-tooth voltage 13 and the DC grid bias, all of which signals are impressed upon the control grid of the tube element 40. As best visualized from the "synchrogram" in FIG. 2, the phase of the output pulses 70, 70′ and 70″ will continuously vary as a function of the instantaneous value of the modulating voltage 75. Moreover, as disclosed in the "synchrogram" of FIG. 2, the extremes of the phase modulation of the audio input voltage 75 ranges over a period of about 212°. In other words, the pulse 70 may be advanced about 106° to position 70′ and retarded about 106° to position 70″, to approach a phase modulating index of about 2. The phase modulation index is conventionally determined by the number of radians that the phase is either retarded or advanced. The phase-modulated pulses 70, 70′ and 70″ developed in the output circuit 51 may then drive a series of frequency multipliers, not shown, to obtain the desired frequency deviation.

In the operation of this invention, the phase variation of the output pulses 70 is directly proportional to the amplitude of the modulating voltage 75. Thus, by reducing the audio input from 12 to 6 volts, the modulation index is reduced to about 1, or about 53°.

Moreover, the modulation index may be increased, theoretically, by increasing the hysteresis range relative to the positive-directed portion of the saw-tooth waveform 13. Thus, one of the limitations upon the maximum value of the modulation index is attained as the hysteresis range approaches the full height of the waveform 13.

In conventional phase madulators having modulation indices of about 0.2, the frequency of the output signals must be multiplied many times in order to obtain the desired frequency deviation. However, where the phase modulation index is much greater, such as in the abovedescribed phase modulator, fewer frequency multiplication stages are required, resulting not only in greater economy, but also in a reduction of noise. The more the frequency must be multiplied, the more the noise is multiplied.

Although the particular circuit with its respresentative component values disclosed in FIG. 1 have proven to obtain the results disclosed in the "synchrogram" of FIG. 2, it will be understood that various elements of different values may be substituted in order to obtain substantially the same results, or results varying only in degree. For example, the circuits 10 and 12 might be replaced by other means of generating the saw-tooth waveform voltage having similar characteristics to that of 13 in FIG. 2. However, the stabilizing crystal frequency should be maintained in any saw-tooth generator.

It will be apparent to those skilled in the art that various changes may be made in the invention without departing from the spirit and scope thereof, and therefore the invention is not limited by that which is shown in the drawing and described in the specification, but only as indicated in the appended claims.

What is claimed is:

1. A phase modulator comprising:

(a) a generator of a radio frequency carrier wave voltage, (b) an integrator circuit coupled to said generator for converting said carrier wave voltage to a saw-tooth waveform voltage of the same radio frequency, (c) an electronic trigger circuit having an input and an output, (d) means for applying said saw-tooth voltage to the input of said trigger circuit to produce at said output a continuous train of pulses of the same radio frequency as said carrier wave voltage, and (e) means for applying a modulating voltage to said input to vary the phase of said pulses, said phase variation being directly proportional to the amplitude of said modulating voltage.

2. The invention according to claim 1 in which said trigger circuit comprises a Schmitt trigger, and means in said output for producing sharp positive pulses.

3. The invention according to claim 1 in which said modulating voltage has an audio-frequency, and the radio-frequency voltage is a continuous, pure sinusoidal wave.

References Cited by the Examiner

UNITED STATES PATENTS

| | | | |
|---|---|---|---|
| 2,266,401 | 12/1941 | Reeves | 332—14 X |
| 2,556,457 | 6/1951 | Watts | 332—14 |
| 2,899,552 | 8/1959 | French | 331—144 X |
| 3,045,071 | 7/1962 | Matthews | 332—9 X |
| 3,138,767 | 6/1964 | Levin | 331—144 |
| 3,153,196 | 10/1964 | McGuire | 325—164 X |

ROY LAKE, *Primary Examiner.*

ALFRED L. BRODY, *Examiner.*